UNITED STATES PATENT OFFICE.

SAMUEL P. CITIZEN, OF TERRE HAUTE, INDIANA, ASSIGNOR TO HIMSELF, AND C. M. WELLSFORD, OF GUTHRIE, OKLAHOMA TERRITORY.

PAINT.

SPECIFICATION forming part of Letters Patent No. 479,785, dated August 2, 1892.

Application filed July 3, 1891. Serial No. 398,348. (No specimens.)

*To all whom it may concern:*

Be it known that I, SAMUEL P. CITIZEN, a citizen of the United States, residing at Terre Haute, in the county of Vigo, in the State of Indiana, have invented a new and useful Paint, of which the following is a specification.

The purpose of my invention is to make durable water-proof paint. The ingredients employed are resin-oil, blue-stone, (blue vitriol,) and Chattanooga-red mineral paint, or other mineral paints or pigments. The resin-oil in its commercial state is found to be unsuitable for an ingredient of mineral paints. It cannot be properly incorporated therewith. Consequently the composition will not harden sufficiently for service. I have found, however, that resin-oil, when mixed with blue vitriol, is suitable to form a component part of a valuable paint.

The process of preparing my paint is as follows: Five pounds of blue-stone (blue vitriol) is added to fifty gallons of resin-oil and the mixture slightly stirred until a chemical union occurs. To expel any water present, the compound is now brought to the boiling-point and Chattanooga red in the proportion of four pounds to the gallon is to be sifted in, the heating being continued during this operation. The composition is now ready for use.

A paint thus prepared is suitable for all ordinary exterior coatings; but where a fine finish is required the paint should be ground after the cooling process. The paint may be thinned with spirits of turpentine, and if it be required to harden quickly a little japan may be added.

Various colors may be attained by the addition of various colored pigments to the paint.

Having thus described my invention, I claim—

The improved paint consisting of resin-oil, sulphate of copper, and Chattanooga red, substantially as specified.

SAMUEL P. CITIZEN.

Witnesses:
G. L. CHAPIN,
THOMAS E. DYER.